(12) United States Patent
Pohlmann

(10) Patent No.: US 8,990,798 B2
(45) Date of Patent: Mar. 24, 2015

(54) SOFTWARE APPLIANCE INSTALLATION SYSTEMS AND METHODS

(71) Applicant: SAP AG

(72) Inventor: Michael Pohlmann, Walldorf (DE)

(73) Assignee: SAP AG, Walldorf (DE)

(*) Notice: Subject to any disclaimer, the term of this patent is extended or adjusted under 35 U.S.C. 154(b) by 141 days.

(21) Appl. No.: 13/631,526

(22) Filed: Sep. 28, 2012

(65) Prior Publication Data

US 2014/0096128 A1 Apr. 3, 2014

(51) Int. Cl.
*G06F 9/445* (2006.01)

(52) U.S. Cl.
CPC ........................ *G06F 8/61* (2013.01)
USPC .......................................... 717/176

(58) Field of Classification Search
CPC ............ G06F 9/44; G06F 8/443; G06F 8/10; G06F 8/61; G06Q 10/06; G06Q 30/02; G06Q 3/01
USPC ........................................ 717/176
See application file for complete search history.

(56) References Cited

U.S. PATENT DOCUMENTS

| | | | |
|---|---|---|---|
| 8,438,654 B1* | 5/2013 | von Eicken et al. | 726/27 |
| 2008/0244525 A1* | 10/2008 | Khalil et al. | 717/124 |
| 2009/0300596 A1* | 12/2009 | Tyhurst et al. | 717/173 |
| 2010/0042720 A1 | 2/2010 | Stienhans et al. | |
| 2010/0169477 A1 | 7/2010 | Stienhans et al. | |
| 2010/0169497 A1 | 7/2010 | Klimentiev et al. | |
| 2010/0299366 A1 | 11/2010 | Stienhans et al. | |
| 2011/0047540 A1* | 2/2011 | Williams et al. | 717/178 |
| 2011/0252137 A1 | 10/2011 | Stienhans et al. | |
| 2011/0289518 A1* | 11/2011 | Li et al. | 719/324 |
| 2011/0296370 A1* | 12/2011 | Ferris et al. | 717/100 |
| 2012/0124129 A1 | 5/2012 | Klimentiev et al. | |
| 2014/0047081 A1* | 2/2014 | Edwards | 709/220 |

* cited by examiner

*Primary Examiner* — Don Wong
*Assistant Examiner* — Reshaun M Finkley
(74) *Attorney, Agent, or Firm* — Foley & Lardner LLP

(57) ABSTRACT

Systems and methods of installing a software appliance via a computer network are shown and described. Such a method may include detaching, by at least one processing circuit, the software appliance from an operating system of a computing device. The method may further include establishing a network connection with a virtual server in a cloud computer system. The method may also include attaching the software appliance to an operating system of the virtual server of the cloud computer system.

15 Claims, 7 Drawing Sheets

SOFTWARE APPLIANCE INSTALLATION SYSTEMS AND METHODS

BACKGROUND

The present disclosure relates generally to systems and methods for installing software appliances.

A software appliance is a software application that may be combined with an operating system for the software appliance to run on different industrial standard hardware (e.g., a computer, a server). The software appliance can be generated and configured at one machine (e.g., in the form of an image stored in a DVD) and then installed at another machine. It is challenging and difficult to conduct such a second application installation without repeating or changing each of the configuration tasks conducted at the first machine. Conventional methods include requiring that the second installation be customized and human time intensive.

SUMMARY

One aspect of an exemplary embodiment is directed to a computer-implemented method of installing a software appliance via a computer network. The method includes detaching, by at least one processing circuit, the software appliance from an operating system of a computing device. The software appliance can include at least a system and a database. The method includes storing, by the at least one processing circuit, information of the software appliance into files. The method also includes establishing a network connection with a virtual server in a cloud computer system. The method further includes determining the software appliance is compatible with the virtual server of the cloud computer system based at least in part on the information of the software appliance stored in the files. The method also includes configuring network settings and network interfaces for the software appliance based at least in part on results of the determining of the software appliance is compatible with the virtual server of the cloud computer system. The method additionally includes activating virtual hostnames for the software appliance on the virtual server and attaching the software appliance to an operating system of the virtual server of the cloud computer system.

Another aspect of an exemplary embodiment is directed to a system for installing a software appliance via a computer network. The system includes at least one processing circuit configured to detach the software appliance from an operating system of a computing device and store information of the software appliance into files. The software appliance can include at least a system and a database. The at least one processing circuit is further configured to establish a network connection with a virtual server in a cloud computer system. The at least one processing circuit is also configured to determine the software appliance is compatible with the virtual server of the cloud computer system based at least in part on the information of the software appliance stored in the files. The at least one processing circuit is configured to configure network settings and network interfaces for the software appliance based at least in part on results of the determining of the software appliance is compatible with the virtual server of the cloud computer system. The at least one processing circuit is additionally configured to activate virtual hostnames for the software appliance on the virtual server, and attach the software appliance to an operating system of the virtual server of the cloud computer system.

Another aspect of an exemplary embodiment is directed to a non-transitory computer readable medium having machine instructions stored therein, the instructions being executable by one or more processors to cause the one or more processors to perform operations. The operations include detaching a software appliance from an operating system of a computing device and storing information of the software appliance into files. The software appliance includes at least a system and a database. The operations also include establishing a network connection with a virtual server in a cloud computer system. The operations further include determining the software appliance is compatible with the virtual server of the cloud computer system based at least in part on the information of the software appliance stored in the files. The operations include configuring network settings and network interfaces for the software appliance based at least in part on results of the determining of the software appliance is compatible with the virtual server of the cloud computer system. The operations additionally include activating virtual hostnames for the software appliance on the virtual server, and attaching the software appliance to an operating system of the virtual server of the cloud computer system.

BRIEF DESCRIPTION OF THE DRAWINGS

Various embodiments taught herein are illustrated by way of example, and not by way of limitation, in the figures of the accompanying drawings, in which.

DETAILED DESCRIPTION

The more detailed descriptions of various concepts related to, and embodiments of, methods, apparatuses, and systems for installing a software appliance over a computer network are provided below. The disclosure is not limited to the details or methodology set forth in the descriptions or illustrated in the figures. Terminology is for the purpose of description only and should not be regarded as limiting.

Referring generally to the Figures, systems and methods for installing a software appliance in a cloud computing environment are shown and described. Installing appliances on a virtual server in a computing environment is conventionally done by logging into the virtual server and conducting a fresh installation of an application. For complex applications which depend on particular operating system, server, and/or database resources for operation, a new installation and configuration can be a time consuming and manual process. Rapid application development tools such as the Virtual Appliance Factory provided by SAP AG advantageously speed deployment and configuration time of applications (e.g., a NETWEAVER sold by SAP AG) by providing mechanisms such as application templates for a variety of operating systems and operating cases. A method of the present disclosure includes detaching a configured application (e.g., such that the applications is installed and tested, configured with a development tool such as Virtual Appliance Factory, etc.) from the operating system of a first computing device (e.g., the device upon which the Virtual Appliance Factory was first installed). The method further includes establishing a network connection with a virtual server in a cloud computer system and attaching the software appliance to an operating system of the virtual server of the cloud computer system. This attachment is completed such that full reinstallation and configuration of the application does not need to occur on the operating system of the virtual server. Using such a method, applications installed and tested locally can be rapidly installed at a virtual server on a cloud-based computing system (e.g., Amazon Web Services). In an exemplary embodiment, the combination of a detachment utility on the first device and the combination of an attachment utility on the second device allows the distribution of complex applications in pre-installed, pre-configured, and pre-patched states. Substantially the only configuration necessary may be to execute the attachment utility. The labor expended installing the application on the first device is not lost when the user would like to move the application to a second device such as a cloud-based virtual server.

Figure 1:
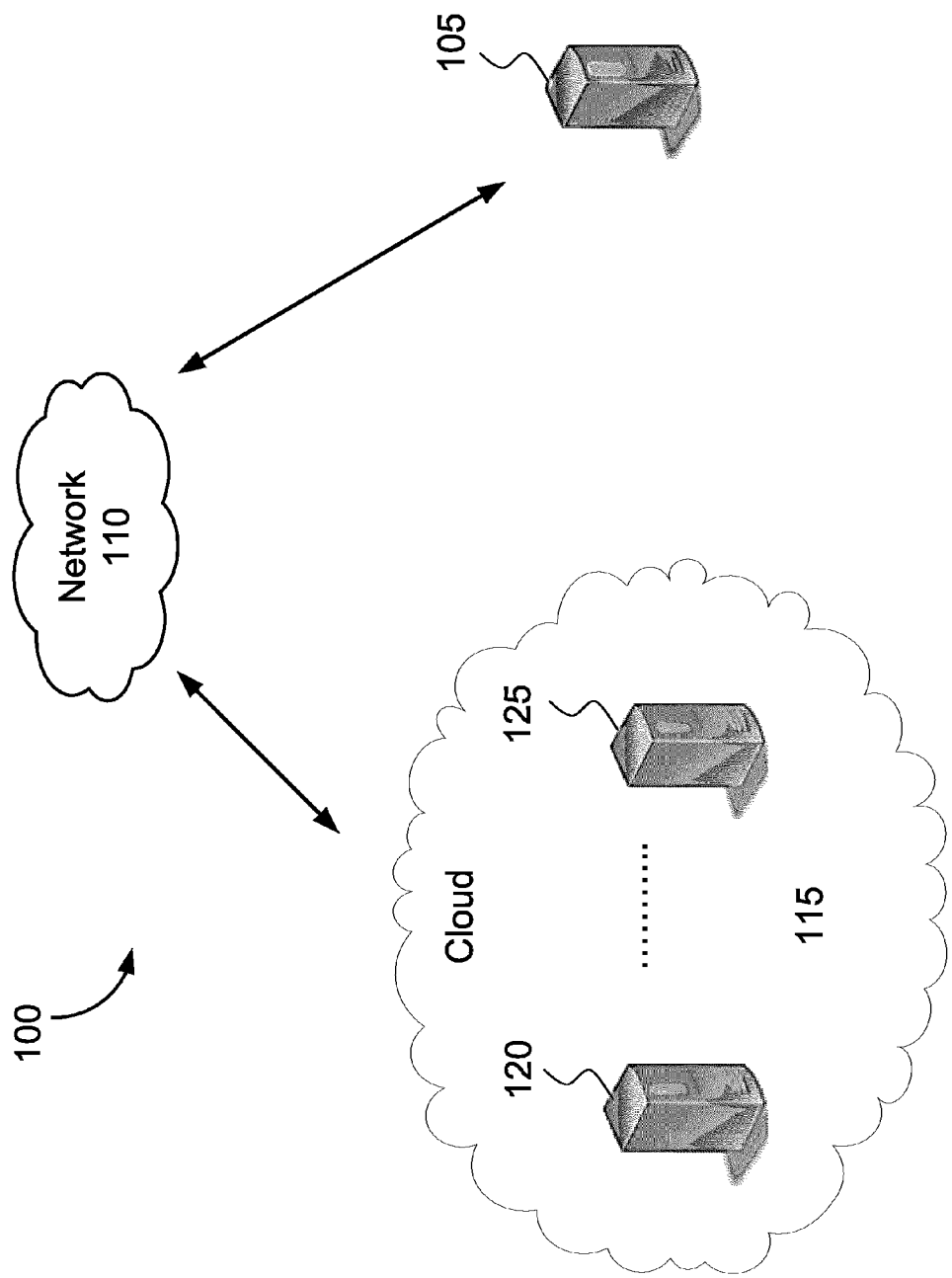
FIG. 1 is a block diagram depicting an example system for installing a software appliance via a computer network, according to an illustrative embodiment.

FIG. 1 is a block diagram depicting a system 100 for installing a software appliance (e.g., an appliance or system of the NETWEAVER produce family sold by SAP AG, etc.) via a computer network 110. It should be noted that although some of the embodiments disclosed herein relate to installation over a network, a detached appliance may be stored and physically shipped on a CDROM or another computer-readable media for installation at a second device.

System 100 includes a computing device 105 which communicates with other computing devices via a network 110. For example, computing device 105 may communicate with one or more computing devices or servers in the same or a different location. In another example, device 105 may communicate with one or more servers ranging from a first server 120 up to an nth server 125 in a cloud computer system 115 or a cloud 115. Servers 120, 125 can be either physical or virtual computing resources in the cloud 115. For example, servers 120, 125 may include the information necessary to run application software, and may include different operating systems, such as Windows®, Linux®, or UNIX® operating systems.

In some embodiments, cloud 115 can be implemented in an internal corporate network or the public Internet, accessible via network 110. The cloud 115 can be a public cloud (e.g., Amazon Web Services®), a private cloud, a community cloud, or a hybrid cloud. In a public cloud, a service provider can make its applications, storage, and other resources available to the general public or subscribers over the Internet. A private cloud can be a cloud infrastructure operated solely for a single organization, whether managed internally or by a third-party and hosted internally or externally. A community cloud shares infrastructure between several organizations from a specific community with common concerns (security, compliance, jurisdiction, etc.), whether managed internally or by a third-party and hosted internally or externally. A hybrid cloud can be a composition of two or more clouds (private, community or public) that remain unique entities but are bound together, offering the benefits of multiple deployment models.

The computing device 105 can include at least a processor or processing circuit and memory. Computing device 105 may be a server, workstation computers, laptop, desktop, smart phone, tablet, or any other computing device upon which an appliance may be installed originally. The computing device 105 may execute software applications (e.g., virtual desktop software, file transfer software, a detachment utility, etc.) stored in memory of the computing device. The software applications may generally facilitate the methods described herein and may facilitate sending and receiving data to and from other computing devices (e.g., servers 120, 125, other physical machines or virtual servers in a cloud computer system) over network 110.

Network 110 can be or include computer networks such as the Internet, local area network (LAN), wide area network (WAN), metro or other area networks, cellular networks, intranets, satellite networks, or other computer networks. Network 110 may also include any number of hardwired and/or wireless connections. For instance, device 105 may communicate wirelessly (e.g., via WiFi, cellular, radio, etc.) with a transceiver that is hardwired (e.g., via a fiber optic cable, a CAT5 cable, etc.) to other computing devices in network 110. Network 110 may further include any number of computing devices, for example servers, computers, routers, and network switches, that are configured to receive and/or transmit data within network 110.

In one embodiment, software appliances can be generated using a computing device or a server (e.g., via Virtual Appliance Factory software offered by SAP AG). For example, the computing device 105 can package a software stack (e.g., a software application, a system) and any of its required dependencies (e.g., an underlying database) into a software appliance in the form of an image. The software appliance can run on various operating systems, such as Windows®, Linux®, or UNIX® operating systems. To deliver and install the software appliance to another machine, such as a virtual server in a cloud computer system, the software appliance can be detached from the operating system before the delivery.

Figure 2:
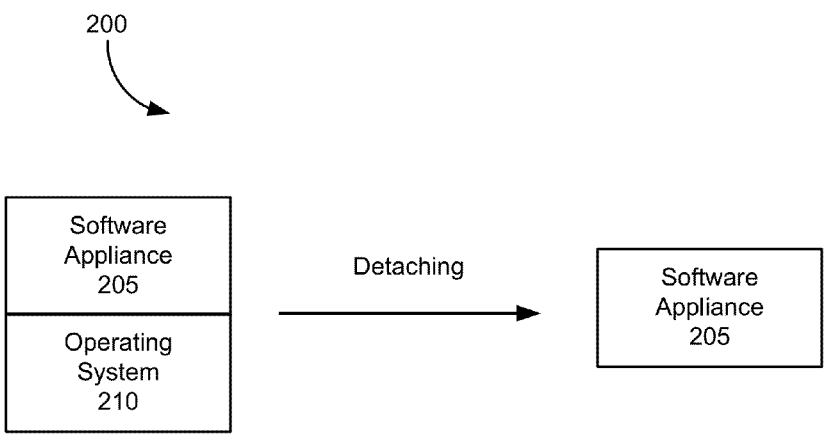
FIG. 2 is an illustration of detaching a software appliance from its underlying operating system, according to an illustrative embodiment.

FIG. 2 is an illustration 200 of detaching a software appliance from its underlying operating system. As shown in FIG. 2, a software appliance 205 can run on an operating system 210 of a computing device, such as the computing device 105 in FIG. 1. In one embodiment, a request may be received at the computing device 105 for installing the software appliance 205 at a different machine. The machine can be a virtual server 120 or 125 in the cloud computer system 115 in FIG. 1. For example, a customer can send a request to the computing device 105 via the network 110. The request may include specific requirements for the software appliance, such as what kind of application software is needed by the customer.

The computing device 105 can stop the running software appliance 205, for example after a request for the software appliance is received. The device 105 can then detach the software appliance 205 by unregistering the database and the software stack (e.g., the system) in the software appliance 205 from the operating system 210. In some embodiments, the computing device 105 may write the relevant information of the system and the database into files. The information stored in the files may be used when the software appliance 205 is attached to another machine. In an exemplary embodiment, after an appliance is "detached," and detached repository files are created, the appliance can be reattached and/or restarted on the first device 105.

After the software appliance 205 is detached from the operating system 210, the software appliance 205 can be saved as a library or repository (e.g., code, configuration information, requirement descriptions, operating system registry change descriptions, and/or appliance data) and delivered to the customer for installation. In one embodiment, the library can be stored in a DVD, for example, and physically shipped to the customer. In other embodiments, the library can be delivered as an image or an electronic file via the network 110 to a machine at the customer's site. For example, the library can be sent via the network 110 to a virtual server in the cloud 115. A utility for attaching the appliance to the second system can also be provided with the library.

Figure 3:
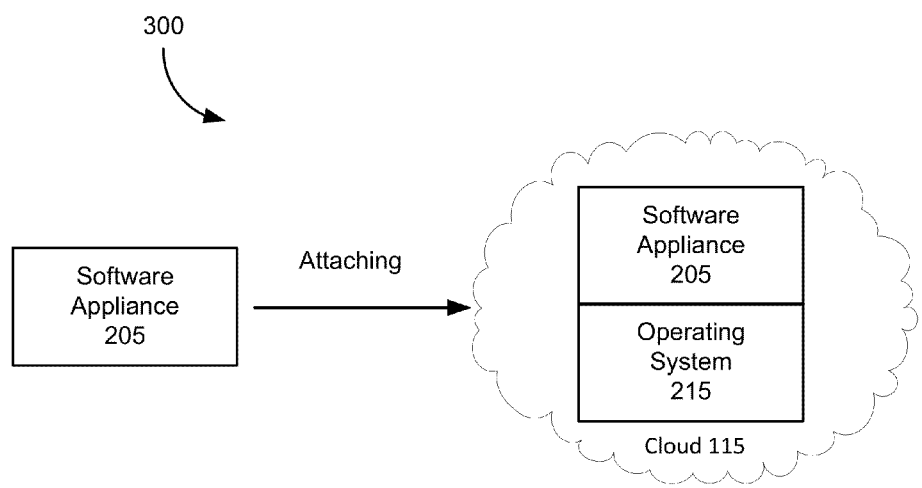
FIG. 3 is an illustration of attaching a software appliance to an operating system of a machine, according to an illustrative embodiment.

FIG. 3 is an illustration 300 of attaching a software appliance to an operating system of a machine. In one embodiment, the machine can be a virtual server (e.g., 120, 125 in FIG. 1) in a cloud computer system, such as cloud 115. For example, the computing device 105 may establish a network connection with the virtual server 120. The computing device 105 may then determine if the software appliance 205 is compatible with the virtual server 120 by performing various checks. For example, the computing device 105 may check if the software appliance 205 is compatible with the operating system 215 of the virtual server 120. The checks may produce results with different severity levels. In one embodiment, if all the checks are passed or if the non-passing checks are only at warning level, the attaching process may begin. The software for conducting the checks may be executed on the first device 105 or the second device 120. In some systems, e.g., where local permissions are needed to conduct each of the checks or attachment steps, computer code for conducting the checking and the subsequent attaching may be transferred to memory of the second device with (or separately from) the library for execution by the second device.

In one embodiment, various configurations may be performed before the software appliance 205 is attached to the virtual server in the cloud computer system. For example, the computing device 105 may configure network settings and operating system 215 of virtual server 120 in cloud 115 via network 110. The computing device 105 may activate the virtual hostnames for the software appliance 205. The computing device 105 may then attach the software appliance 205 to the operating system 215 of the virtual server 120.

Figure 4:
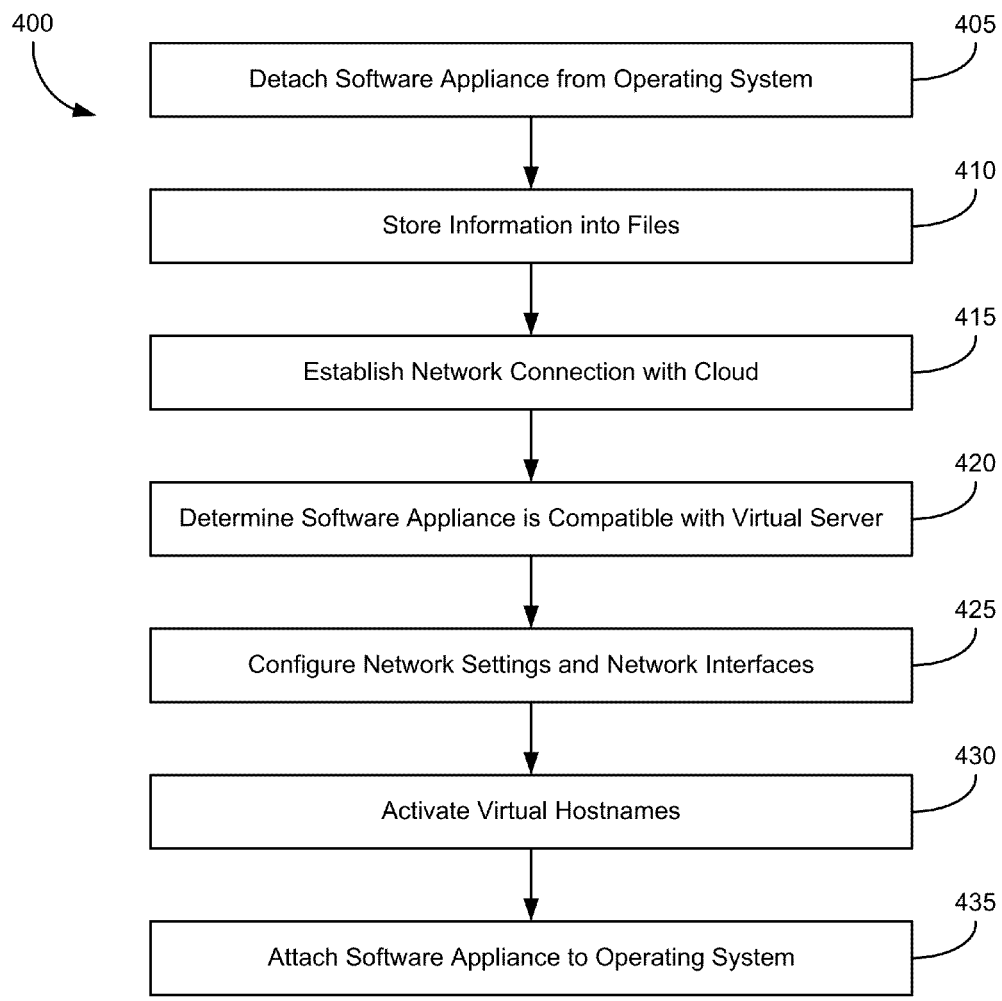
FIG. 4 illustrates a flow diagram depicting a process of installing a software appliance via a computer network, according to an illustrative embodiment.

FIG. 4 illustrates a flow diagram depicting a process 400 of installing a software appliance via a computer network. Process 400 includes detaching the software appliance from an operating system of a computing device (BLOCK 405). For example, one or more processing circuits of the computing device can be configured to detach the software appliance from the operating system of the computing device. In one embodiment, a software appliance may include a system and a database. For example, the process 400 can detach the software appliance by stopping the running system and unregistering the database and the system from the underlying operating system.

The system in the software appliance can be an application software designed to meet one or more business or industrial needs. For example, the system can be a business solution application software for payroll management, resource planning management, or product lifecycle management. In other examples, the appliance can be a development tool. The database in the software appliance can be the database software underneath the system in the software appliance. For example, the database software can include SAP MaxDB®, Oracle®, IBM DB2®, Microsoft SQL Server® or other database software.

Process 400 includes storing information of the software appliance into files (BLOCK 410). For example, the one or more processing circuits of the computing device can be configured to store configuration information of the software appliance into various configuration files. In one embodiment, the information stored can include the system identifier, the system number, user information, virtual hostnames, ports, etc. associated with the software appliance. In some embodiments, the registry-keys needed for the database and the system in the software appliance may be exported into files. The user information and the Access Control Lists (ACLs) for the operating system file system layout may also be exported. An ACL can be a list of permissions attached to an object, which may specify which users or system processes are granted access to the object, and what operations are allowed on the object. Each entry in an ACL may specify a subject and an operation. For example, if a file has an ACL that contains (John, delete), this can give John permission to delete the file.

Process 400 includes establishing a network connection with a virtual server in a cloud computer system (BLOCK 415). The network connection can be established in many ways, e.g., using the various computer networks described herein. For example, the connection can be via the Internet using a user interface displayed in a web browser. The cloud computer system can be a public cloud (e.g., Amazon Web Services®), a private cloud, a community cloud, or a hybrid cloud, as described previously. A virtual server can be a computing resource instantiated or created in a cloud computer system. The computing resource may include all the information necessary to run application software and may include an operating system.

Figure 5:
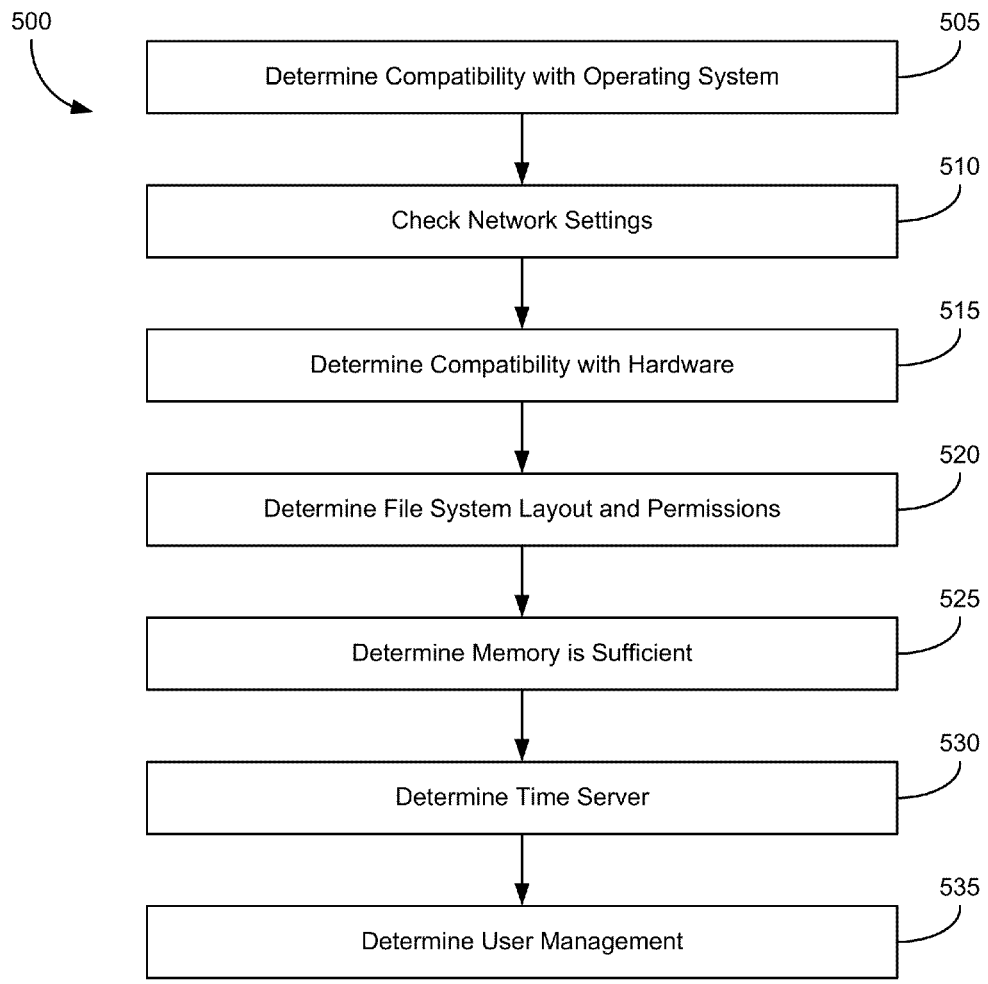
FIG. 5 illustrates a flow diagram depicting a process of determining compatibility between a software appliance and a virtual server, according to an illustrative embodiment.

Process 400 includes determining whether the software appliance is compatible with the virtual server of the cloud computer system based at least in part on the information of the software appliance stored in the files (BLOCK 420). For example, process 400 may include checking whether the software appliance is compatible with the operating system version of the virtual server. In another example, a software or data dependency of the appliance identified may be checked relative to software or data of the operating system of the virtual server. The settings stored in the files when the software appliance was detached from the operating system can be compared with the host settings of the virtual server. Process 400 may also include checking the virtual server's network settings, hardware, file system layout and permissions, memory space, time server, user management, virtual hostnames, or other parameters to determine if the system and the database in the software appliance can run on the virtual server. A more detailed example of the compatibility determination between the software appliance and the virtual server is illustrated in FIG. 5, described below.

Process 400 may include configuring network settings and network interfaces for the software appliance based at least in part on results of the determination of whether the software appliance is compatible with the virtual server of the cloud computer system (BLOCK 425). In one embodiment, the checks in the determination step (BLOCK 420) may produce results with different severity levels, for example, fatal/error/warning or critical/high/medium/low. In one embodiment, if all the checks are passed or if the non-passing checks are only at warning or low level, the process 400 may continue to configure the network settings and network interfaces of the virtual server. Otherwise, for example in one embodiment, the process 400 may abort the process and establish network connection with another virtual server in the cloud. In yet other embodiments the checks in the determination step can result in corrective action (e.g., downloading an additional driver determined to be required by the appliance but missing from the new system).

Figure 6A:
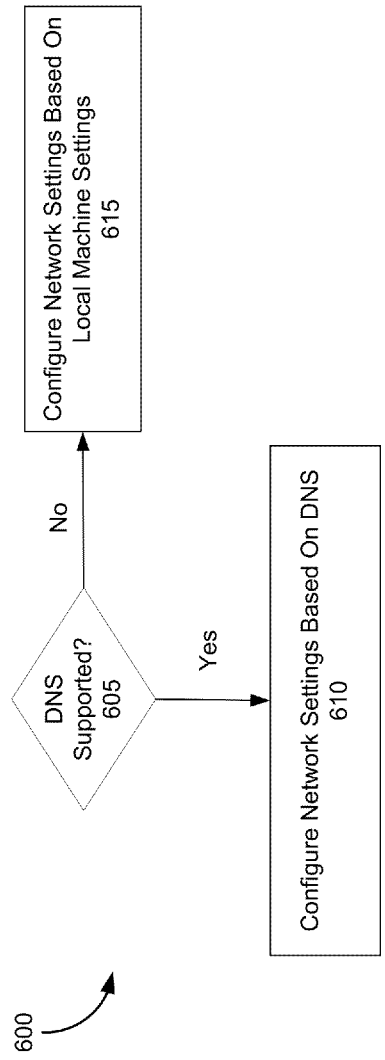
FIG. 6A illustrates a flow diagram depicting a process of configuring network settings for a software appliance, according to an illustrative embodiment.
Figure 6B:
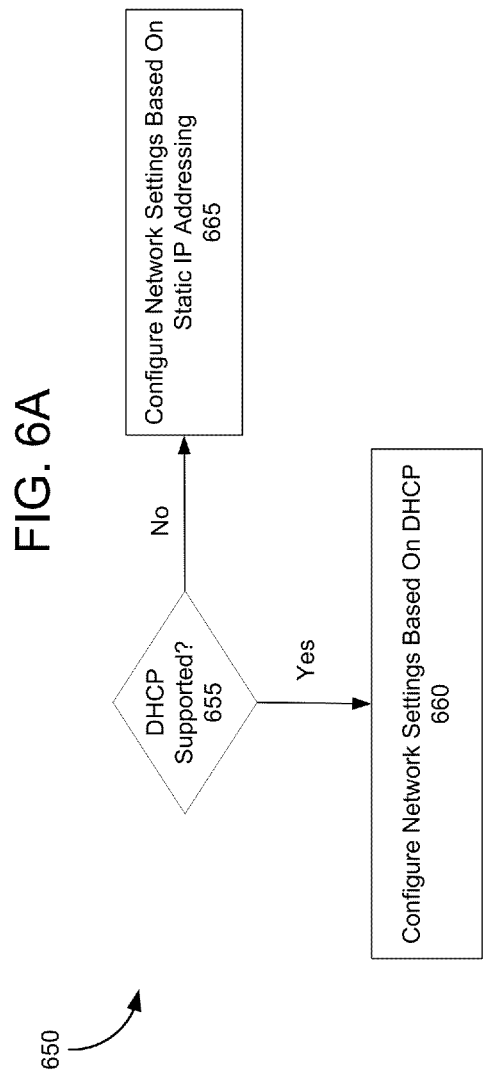
FIG. 6B illustrates a flow diagram depicting a process of configuring network settings for a software appliance, according to an illustrative embodiment.

The network settings and network interfaces for the software appliance can be configured based on the properties or characteristics of the cloud computer system. In general, cloud environments may be very different from each other, for example, they may use different tools or have different configurations. For instance, some cloud computer systems may support Domain Name System (DNS), and some cloud computer systems may support Dynamic Host Configuration Protocol (DHCP). Yet other cloud computer systems may support both DNS and DHCP, while some other cloud computer systems may support neither. There are various ways to configure the network settings and network interfaces in the cloud environment. FIGS. 6A and 6B provide non-limiting examples illustrating network settings configuration for the software appliance, which will be described later.

Process 400 includes activating virtual hostnames for the software appliance on the virtual server of the cloud computer system (BLOCK 430). In general, cloud hosts or virtual servers in the cloud computer system may not have hostnames. They can simply be "anonymous" machines in the cloud. However, the software appliance may need use of a virtual hostname to support its code and/or activities. In one embodiment, for example, the virtual hostnames of the system in the software appliance may be activated using the following command or an alternative command for activating a virtual hostname:

/usr/sap/hostctrl/exe/sapacosprep -x -a ifup -i eth<x>-h<virt.hostname>-v 1

Process 400 includes attaching the software appliance to an operating system of the virtual server of the cloud computer system (BLOCK 435). In one embodiment, after the settings of the virtual server have been configured for the software appliance, the software appliance can be attached to the operating system of the virtual server. For example, process 400 can register the database in the software appliance with the operating system of the virtual server and then start the database. Similarly, process 400 can register the system in the software appliance with the operating system of the virtual server and then start the system. At this point, the installation process can be considered completed and the software appliance can be running on the virtual server.

FIG. 5 illustrates a flow diagram depicting a process 500 of determining compatibility between a software appliance and a virtual server. Process 500 includes determining the software appliance is compatible with an operating system of the virtual server of the cloud computer system (BLOCK 505). For example, the operating system versions, the operating system kernel, the glibc version, and/or the kernel parameters may be checked to ensure that the settings in the software appliance match the settings on the virtual server. The settings in the software appliance may have been stored in the configuration files during the detaching process.

Process 500 includes checking network settings of the virtual server of the cloud computer system (BLOCK 510). For example, the network settings of the virtual server may be checked to see if it supports DNS or DHCP or other protocols. Process 500 also includes determining if the software appliance is compatible with the hardware of the computing device underlying the virtual server of the cloud computer system (BLOCK 515). For example, the disk storage system (e.g., cloud-based virtualized storage space), the network gear (e.g., security firewalls), etc. may be checked to ensure they can support the system and database in the software appliance.

Process 500 includes determining file system layout and permissions of the virtual server of the cloud computer system (BLOCK 520). Different operating systems may have different file system layouts and permissions. For example, some file systems may treat everything in the entire system as a file while other file systems do not. The file system layout and permissions of the virtual server may be checked to make sure they can be used by the system and database in the software appliance. Process 500 further includes determining the virtual server of the cloud computer system has sufficient memory space for the software appliance (BLOCK 525). For example, the size of the RAM, disk space, or swap-space, etc. may be checked to ensure enough space is available to attach and run the software appliance.

Process 500 includes determining correct time server of the cloud computer system (BLOCK 530). In one embodiment, a time server may be a server computer in the cloud computer system that reads the actual time from a reference clock and distributes this information to its clients using a computer network. Process 500 also includes determining correct user-management of the virtual server of the cloud computer system (BLOCK 535). User management can be the process of controlling which users are allowed to access the system. In one embodiment, user management can be performed using Lightweight Directory Access Protocol, Network Information Service, or Local Users.

FIG. 6A illustrates a flow diagram depicting a process 600 of configuring network settings for a software appliance. Process 600 is shown to include a determination step that checks for whether the cloud computer system supports DNS (BLOCK 605). If the cloud computer system supports DNS, process 600 includes configuring network settings based on the DNS (BLOCK 610). For example, the DNS server may be checked to see if it has valid entries for the virtual hostnames that the system in software appliance runs on. In one embodiment, the check can be done by the command "nslookup<virt.hostname>. If no valid answer is given after the command is executed, a warning may be outputted. If the cloud computer system does not support DNS, process 600 includes configuring network settings based on local machine settings of the virtual server (BLOCK 615). In one embodiment, entry can be added to /etc/host file, for example.

FIG. 6B illustrates a flow diagram depicting a process 650 of configuring network settings for the software appliance. Process 650 is shown to include a determination step that checks for whether the cloud computer system supports DHCP (BLOCK 655). If the cloud computer system supports DHCP, process 600 includes configuring network settings based on the DHCP (BLOCK 660). For example, DHCP can automatically configure the IP address for the virtual server on the cloud computer network, thereby assuring the virtual server has a valid, unique IP address. If the cloud computer system does not support DHCP, process 650 includes configuring network settings based on static IP addressing (BLOCK 665). For example, process 650 may assign an IP address to the virtual server.

Figure 7:
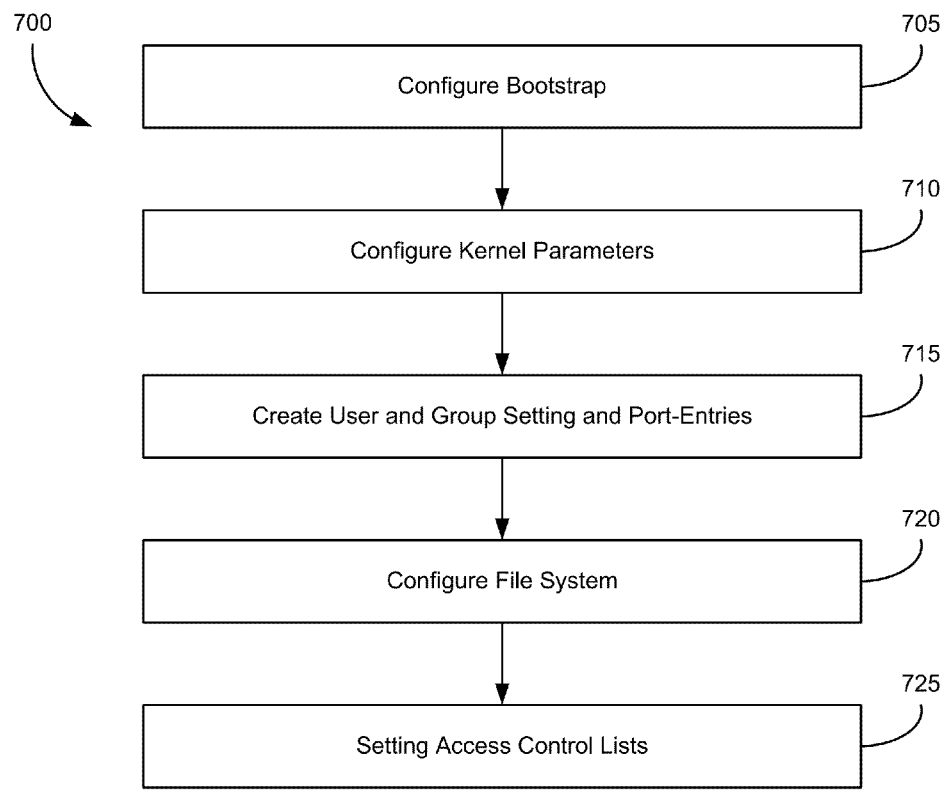
FIG. 7 illustrates a flow diagram depicting a process of configuring a virtual server for a software appliance, according to an illustrative embodiment.

FIG. 7 illustrates a flow diagram depicting a process 700 of configuring a virtual server for a software appliance. Process 700 includes configuring bootstrap for the software appliance (BLOCK 705). A bootstrap protocol can be an Internet protocol which enables computers to boot themselves over the Internet or local network. For example, by configuring bootstrap for the system of the software appliance, the system can run on the virtual server after reboot.

Process 700 includes configuring kernel parameters for the software appliance (BLOCK 710). Similar to other configurations, different operating systems have different ways to configure kernel parameters. For example, kernel parameters can be set by modifying a boot loader configuration file. Process 700 includes creating user and group settings and port-entries for the software appliance (BLOCK 715). This can ensure the correct users and groups to gain access to the system. Process 700 also includes configuring file system for the software appliance (BLOCK 720). In one embodiment, correct access-rights on the operating system level for the software appliance can be set. Process 700 further includes setting access control lists for the software appliance (BLOCK 725). The settings can be based on the access control list exported to the files when the software appliance was detached from the operating system (BLOCK 410 in FIG. 4).

Figure 8:
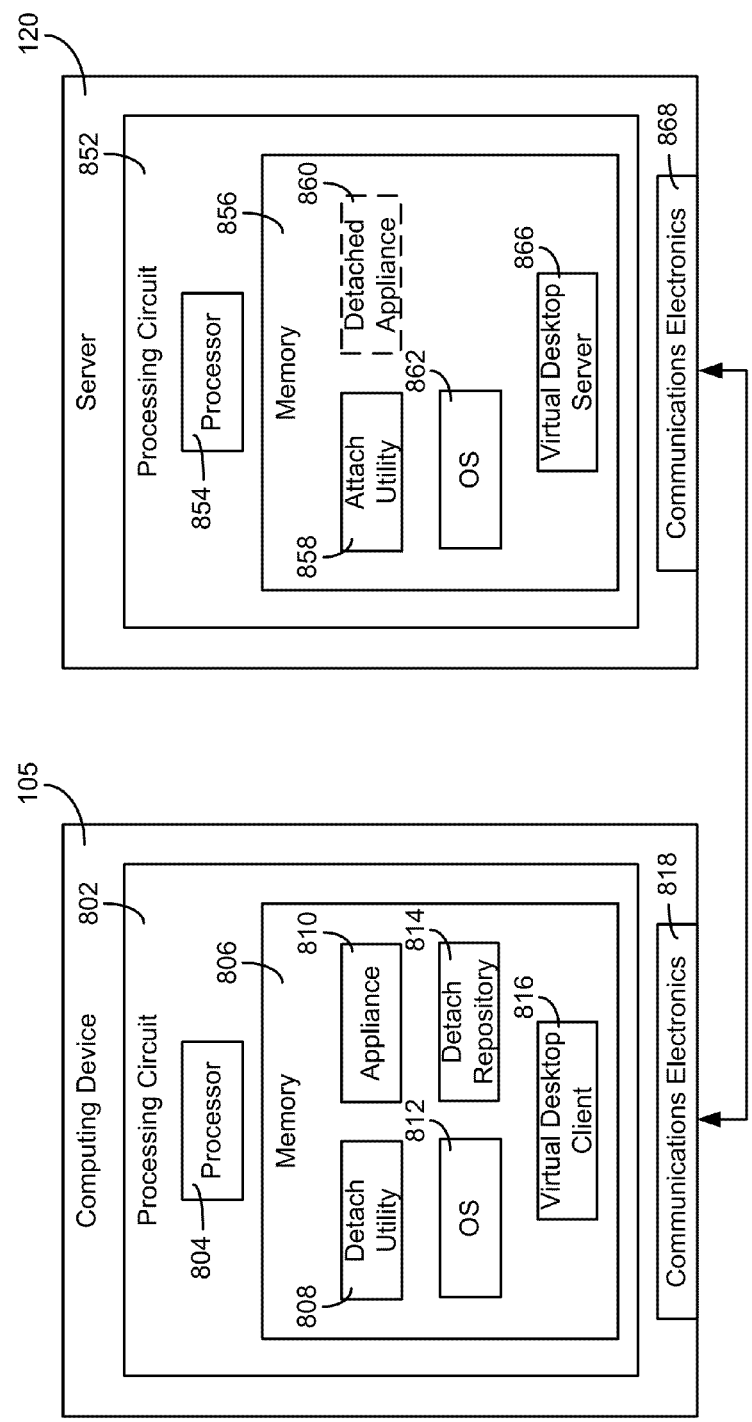
FIG. 8 illustrates a more detailed block diagram of the system for installing a software appliance, according to an illustrative embodiment.

Referring now to FIG. 8, a more detailed block diagram of computing device 105 and server 120 is shown, according to an exemplary embodiment. Computing device 105 and server 120 are each shown to include a processing circuit 802, 852, respectively. Each processing circuit 802, 852 respectively includes a processor 804, 854 and memory 806, 856. Processor 804, 854 may be implemented as a general purpose processor, an application specific integrated circuit (ASIC), one or more field programmable gate arrays (FPGAs), a CPU, a GPU, a group of processing components, or other suitable electronic processing components. Each memory 806, 856 may be or include one or more devices (e.g., RAM, ROM, Flash memory, hard disk storage, etc.) for storing data and/or computer code for completing and/or facilitating the various processes, layers, and modules described in the present disclosure. Memory 806, 856 may include volatile memory or non-volatile memory.

Memory 806, 856 may include database components, object code components, script components, or any other type of information structure for supporting the various activities and information structures described in the present disclosure. Memory 806, 856 may be communicably connected to processor 804, 854 via processing circuit 802, 852 and includes computer code (e.g., via the modules stored in memory) for executing one or more processes described herein. Memory 806, 856 may be non-transient computer-readable media configured to store computer code modules for execution by the processor and/or other components of the processing circuit. Particularly, memory 806, 856 may include a module or modules for appropriately completing each step of the processes described herein.

In the exemplary embodiment shown in FIG. 8, memory 806 of computing device 105 is shown to include a detach utility 808, an appliance 810 (e.g., a software appliance 205 as described in FIGS. 2-3), an operating system (OS) 812, detach repository 814, and virtual desktop client 816. In the exemplary embodiment shown in FIG. 8, memory 856 of server 120 is shown to include an attach utility 858, appliance 860 (e.g., a software appliance 205 as described in FIGS. 2-3), an OS 862, and virtual desktop sever 866.

Computing device 105 includes communications electronics 818 and server 120 includes communications electronics 868. Communications electronics 818, 868 may include wired or wireless interfaces (e.g., jacks, antennas, transmitters, receivers, transceivers, wire terminals, Ethernet ports, WiFi transceivers, etc.) for conducting data communications between computing device 105 and server 120, and between computing device 105 and server 120 and other local or remote devices or systems of system 100.

Referring still to FIG. 8, detach utility 808 may be configured to generate user interfaces for allowing a user to control or execute a detach process. In an exemplary embodiment, such user interfaces can include options for configuring a network adapter, options for configuring a network subnet, options for installing an AAC agent, options for otherwise configuring the network, and/or options for configuring a bootstrap. The user interfaces can include options for preparing the detachment, detaching users, and/or detaching file system ACLs. The user interfaces can also or alternatively include options for detaching a database and/or detaching a database environment. The user interfaces can also or alternatively include options for detaching the appliance and/or detaching the appliance environment. In an exemplary embodiment, the user interfaces can further include options for reattaching the database and/or appliance. In an exemplary embodiment, the user interface can also include options for archiving the database data, user data, or other data used by the appliance on the first system. The processes for detaching may deregister the database and deregister the appliance from the first system.

All relevant information of the database and/or appliance may be written into a file or files as a result of the detachment processes. Registry keys and other system settings necessary for proper operation may also be written to files which memorialize such settings for later application upon attachment. The detachment processes may also export user information and ACLs for the OS file system layout. The detach utility 808 can store all of the files that result during the detachment as the appliance 810 and/or in a detach repository 814. The system can send the appliance 810, the detach repository 814, and/or an attachment utility to the second device (e.g., server 120) via the communication electronics of both devices. These files may be transmitted to and stored in memory of the server 120 as detached appliance 860.

Referring still to FIG. 8, attach utility 808 may be configured to generate user interfaces for allowing a user to control or execute an attachment process as described herein. In an exemplary embodiment, such user interfaces can include options for configuring a network adapter, options for configuring a network subnet, options for installing an ACC agent, options for otherwise configuring the network, or options for configuring the bootstrap. The user interfaces of the attach utility can further include options for installing an appliance MMC, options for creating users and groups, options for initializing user profiles, options for setting ACL for file systems, options for creating network shares, and options for creating service entries. The user interfaces can further include options for preparing a new database, options for attaching a new database (e.g., the database received from the computing device 105), and/or options for starting the new database. The user interfaces can yet further include options for attaching the appliance, options for processing relative to the appliance, and options for starting the appliance. The attach utility 858, during an exemplary attach process, may install a hostagent, activate virtual hostnames for the appliance and database, install an MMC, create users and groups as necessary, create port or firewall entries, set ACLs for the appliance and database on the OS file system, register the database, register the appliance, and start the database and the appliance.

The above-described systems and methods can be implemented in digital electronic circuitry, in computer hardware, firmware, and/or software embodied on a tangible medium. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the disclosure by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above-described techniques can be implemented on a computer having a display device. The display device can, for example, be a cathode ray tube (CRT) and/or a liquid crystal display (LCD) monitor. The interaction with a user can, for example, be a display of information to the user via a keyboard or a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, smart phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various non-transitory computer readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a non-transitory computer-readable medium. Non-transitory computer-readable star-age media can be non-transitory in nature and can include both computer storage media and communication media including any medium that facilitates transfer of a computer program from one place to another except for a transitory, propagating signal. A storage media can be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of non-transitory computer-readable media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One skilled in the art will realize the disclosure may be embodied in other specific forms without departing from the spirit or essential characteristics thereof. The foregoing embodiments are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

The invention claimed is:

1. A computer-implemented method of installing a software appliance via a computer network, comprising:
　detaching, by at least one processing circuit, the software appliance from an operating system of a computing device by unregistering a software stack and a database in the software appliance from the operating system of the computing device, wherein the software appliance includes at least the software stack and the database;
　storing, by the at least one processing circuit, information of the software appliance into files;
　establishing a network connection with a virtual server in a cloud computer system;
　determining the software appliance is compatible with the virtual server of the cloud computer system based at least in part on the information of the software appliance stored in the files;
　configuring network settings and network interfaces of the virtual server of the cloud computer system for the software appliance based at least in part on results of the determining that the software appliance is compatible with the virtual server of the cloud computer system;
　activating virtual hostnames for the software appliance on the virtual server of the cloud computer system; and
　attaching the software appliance to an operating system of the virtual server of the cloud computer system by registering the software stack and the database in the software appliance with the operating system of the virtual server of the cloud computer system, wherein the registration of the software stack comprises creating users for the software stack, configuring access control lists for the software stack and the database, creating network port settings for the software stack, configuring kernel parameters for supporting the software stack, starting the database, and starting the software appliance using the software stack.

2. The method of claim 1, further comprising:
　configuring the software appliance for the operating system of the first computing device prior to the detaching step;
　wherein the configuration is complete for the operation of the virtual server once the attachment step is complete, and wherein the attachment avoids the need to reconfigure the appliance for the operating system of the virtual server.

3. The method of claim 1, wherein the determining further comprises:
　determining the software appliance is compatible with an operating system of the virtual server of the cloud computer system;
　checking network settings of the virtual server of the cloud computer system;
　determining the software appliance is compatible with hardware of the computing device underlying the virtual server of the cloud computer system;
　determining file system layout and permissions of the virtual server of the cloud computer system;
　determining the virtual server of the cloud computer system has sufficient memory space for the software appliance;
　determining a correct time server of the cloud computer system; and
　determining correct user-management of the virtual server of the cloud computer system.

4. The method of claim 1, wherein the configuring of the network settings further comprises:
　if the cloud computer system supports Domain Name System, configuring network settings based on the Domain Name System;
　if the cloud computer system does not support Domain Name System, configuring network settings based on local machine settings of the virtual server of the cloud computer system.

5. The method of claim 1, wherein the configuring of the network settings further comprises:
　if the cloud computer system supports Dynamic Host Configuration Protocol, configuring network settings based on the Dynamic Host Configuration Protocol;
　if the cloud computer system does not support Dynamic Host Configuration Protocol, configuring network settings based on static IP addressing.

6. A system of installing a software appliance via a computer network, comprising one or more processing circuits configured to:
　detach the software appliance from an operating system of a computing device by unregistering a software stack and a database in the software appliance from the operating system of the computing device, wherein the software appliance includes at least the software stack and the database;
store information of the software appliance into files;
establish a network connection with a virtual server in a cloud computer system;
determine the software appliance is compatible with the virtual server of the cloud computer system based at least in part on the information of the software appliance stored in the files;
configure network settings and network interfaces of the virtual server of the cloud computer system for the software appliance based at least in part on results of the determining that the software appliance is compatible with the virtual server of the cloud computer system;
activate virtual hostnames for the software appliance on the virtual server of the cloud computer system; and
attach the software appliance to an operating system of the virtual server of the cloud computer system by registering the software stack and the database in the software appliance with the operating system of the virtual server of the cloud computer system, wherein the registration of the software stack comprises creating users for the software stack, configuring access control lists for the software stack and the database, creating network port settings for the software stack, configuring kernel parameters for supporting the software stack, starting the database, and starting the software appliance using the software stack.

7. The system of claim 6, wherein the one or more processing circuits are further configured to receive a request for installing the software appliance to the cloud computer system.

8. The system of claim 6, wherein the one or more processing circuits are further configured to:
determine the software appliance is compatible with an operating system of the virtual server of the cloud computer system;
check network settings of the virtual server of the cloud computer system;
determine the software appliance is compatible with hardware of the computing device underlying the virtual server of the cloud computer system;
determine file system layout and permissions of the virtual server of the cloud computer system;
determine the virtual server of the cloud computer system has sufficient memory space for the software appliance;
determine a correct time server for the cloud computer system; and
determine correct user-management of the virtual server of the cloud computer system.

9. The system of claim 6, wherein the one or more processing circuits are further configured to:
configure network settings based on the Domain Name System if the cloud computer system supports Domain Name System; and
configure network settings based on local machine settings of the virtual server of the cloud computer system if the cloud computer system does not support Domain Name System.

10. The system of claim 6, wherein the one or more processing circuits are further configured to:
configure network settings based on the Dynamic Host Configuration Protocol if the cloud computer system supports Dynamic Host Configuration Protocol; and
configure network settings based on static IP addressing if the cloud computer system does not support Dynamic Host Configuration Protocol.

11. A non-transitory computer readable medium having machine instructions stored therein, the instructions being executable by one or more processors to cause the one or more processors to perform operations comprising:
detaching a software appliance from an operating system of a computing device by unregistering a software stack and a database in the software appliance from the operating system of the computing device, wherein the software appliance includes at least the software stack and the database;
storing information of the software appliance into files;
establishing a network connection with a virtual server in a cloud computer system;
determining the software appliance is compatible with the virtual server of the cloud computer system based at least in part on the information of the software appliance stored in the files;
configuring network settings and network interfaces of the virtual server of the cloud computer system for the software appliance based at least in part on results of the determining that the software appliance is compatible with the virtual server of the cloud computer system;
activating virtual hostnames for the software appliance on the virtual server of the cloud computer system; and
attaching the software appliance to an operating system of the virtual server of the cloud computer system by registering the software stack and the database in the software appliance with the operating system of the virtual server of the cloud computer system, wherein the registration of the software stack comprises creating users for the software stack, configuring access control lists for the software stack and the database, creating network port settings for the software stack, configuring kernel parameters for supporting the software stack, starting the database, and starting the software appliance using the software stack.

12. The non-transitory computer readable medium of claim 11, the instructions further comprising instructions to cause the one or more processors to perform operations comprising:
determining the software appliance is compatible with an operating system of the virtual server of the cloud computer system;
checking network settings of the virtual server of the cloud computer system;
determining the software appliance is compatible with hardware of the computing device underlying the virtual server of the cloud computer system;
determining file system layout and permissions of the virtual server of the cloud computer system;
determining the virtual server of the cloud computer system has sufficient memory space for the software appliance;
determining correct time server of the cloud computer system; and
determining correct user-management of the virtual server of the cloud computer system.

13. The non-transitory computer readable medium of claim 11, the instructions further comprising instructions to cause the one or more processors to perform operations comprising:
if the cloud computer system supports Domain Name System, configuring network settings based on the Domain Name System;

if the cloud computer system does not support Domain Name System, configuring network settings based on local machine settings of the virtual server of the cloud computer system.

14. The non-transitory computer readable medium of claim 11, the instructions further comprising instructions to cause the one or more processors to perform operations comprising:

if the cloud computer system supports Dynamic Host Configuration Protocol, configuring network settings based on the Dynamic Host Configuration Protocol;

if the cloud computer system does not support Dynamic Host Configuration Protocol, configuring network settings based on static IP addressing.

15. A computer-implemented method of installing a software appliance via a computer network, comprising:

detaching, by at least one processing circuit, the software appliance from an operating system of a computing device by unregistering a software stack and a database in the software appliance from the operating system of the computing device;

establishing a network connection with a virtual server in a cloud computer system; and attaching the software appliance to an operating system of the virtual server of the cloud computer system by registering the software stack and the database in the software appliance with the operating system of the virtual server of the cloud computer system, wherein the registration of the software stack comprises creating users for the software stack, configuring access control lists for the software stack and the database, creating network port settings for the software stack, configuring kernel parameters for supporting the software stack, starting the database, and starting the software appliance using the software stack.

\* \* \* \* \*